Aug. 15, 1933.  W. A. BRECHT  1,922,227
FLUID PRESSURE BRAKING SYSTEM
Filed March 7, 1931
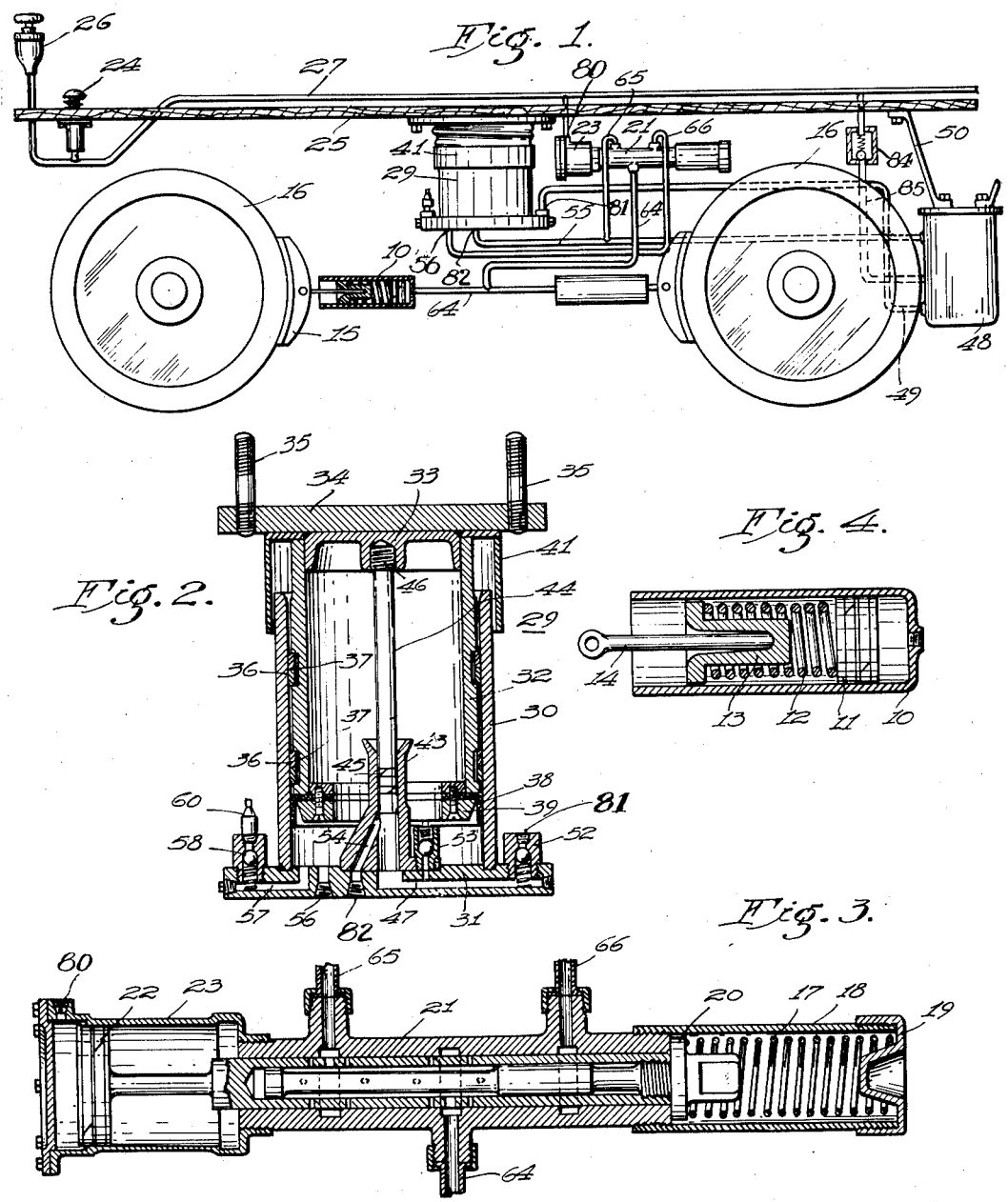
INVENTOR
Winston A. Brecht.
WITNESSES.
BY
ATTORNEY Patented Aug. 15, 1933

1,922,227

UNITED STATES PATENT OFFICE 1,922,227

FLUID PRESSURE BRAKING SYSTEM

Winston A. Brecht, Pittsburgh, Pa., assignor to Westinghouse Electric & Manufacturing Company, a Corporation of Pennsylvania Application March 7, 1931. Serial No. 520,830

6 Claims. (Cl. 303—22)

This invention relates generally to braking systems and particularly to fluid-pressure braking systems for motor vehicles.

The object of the invention, generally stated, is the provision of a braking system that shall be simple and efficient in operation and readily and economically manufactured and installed.

A more specific object of the invention is to provide for subjecting the fluid, provided in a braking system for transmitting a braking effort, to a pressure proportional to the load carried by the vehicle.

A further object of the invention is to utilize the movements of the body of a vehicle relative to the truck frame caused by the vehicle moving over irregularities in the road for delivering a fluid into a braking system and subjecting said fluid to the weight of the vehicle for transmitting a braking effort proportional to the load carried by the vehicle.

Another object of the invention is to utilize the medium, interposed between the body of a vehicle and the fluid of the braking system, for subjecting said fluid to a pressure proportional to the weight carried by the vehicle and for supporting resiliently the body of the vehicle.

Other objects of the invention will, in part, be obvious and, in part, appear hereinafter.

This invention, accordingly, is disclosed in the embodiment thereof shown in the accompanying drawing and comprises the features of construction, the combination of elements and the arrangement of parts which will be exemplified in the construction hereinafter set forth and the scope of the application of which will be indicated in the claims.

For a fuller understanding of the objects of the invention, reference should be had to the following detailed description, taken in connection with the accompanying drawing, in which—

Figure 1 is a view, in side elevation, of a fluid-pressure braking system, for one truck of a vehicle, embodying the features of my invention;

Fig. 2 is a view, in vertical section, of a container, constructed in accordance with my invention, for subjecting the fluid provided in a braking system for transmitting a braking effort, to a pressure proportional to the load carried by the vehicle;

Fig. 3 is a view, in vertical section, of a triple valve adapted for controlling the operations of a fluid-pressure braking system, and, Fig. 4 is a view, in vertical section, of a brake cylinder adapted for use in a fluid-pressure braking system.

Referring now to the drawing, 10 designates a brake cylinder of any suitable design adapted for use in fluid-pressure braking systems. As shown in Fig. 4, a piston 11 is mounted in the brake cylinder 10 and disposed for operation by means of any suitable fluid, such as oil, subjected to a pressure. Any well-known type of brake rigging may be employed for connecting the piston 11 to the brake shoe 15.

In the structure illustrated, the brake rigging comprises a coil spring 12 and a spring-biased cap 13 mounted in the cylinder 10 and a brake rod 14, which has one end connected to the brake shoe 15 and the other end seated in a recess formed in the cap 13.

As will be observed in Fig. 1, a triple valve 21, of any conventional type, is utilized for controlling the movements of the fluid in the braking system. The triple valve 21 may be actuated to its "on" position in various ways. The means shown for actuating the valve 21 comprises a piston 22 mounted in the cylinder 23 and disposed to be subjected to a pressure which moves it against a coil spring 17 which biases the triple valve to its "off" position. As illustrated a foot-pump 24, connected to the cylinder 23 at a point 80 by means of the control pipe 27, is provided for supplying a fluid under pressure to the cylinder 23. The plunger of the foot-pump 24 is biased upwardly by means of the illustrated spring. The control pipe 27 is also connected to the fluid reservoir 48 through means of the illustrated ball-check valve 84 and the pipe 85. For the purpose of keeping the control pipe 27, the cylinder 23 and the foot-pump 24 fully charged with a fluid, a hand-operated pump 26 is connected to the end of the control pipe 27. By operating the hand-pump 26, fluid is drawn from the fluid reservoir 48 through the pipe 85, past the ball-check valve 84 and into the control pipe 27. As is apparent, the hand-pump 26 need be operated only to take care of any diminution of the control fluid resulting from leakage, and the like.

As a means for subjecting the fluid provided in a braking system for transmitting a braking effort to a pressure proportional to the load carried by the vehicle, a container 29, shown in Fig. 2, is provided. The container comprises two relatively movable telescopic cylinders 30 and 32 which are mounted between the body and the truck of a vehicle. The head 31 of cylinder 30 is adapted to be mounted on the truck of the vehicle (not shown). Attached to the cylinder head 33 of cylinder 32 is a body plate 34 which may be connected to the body 25 of the vehicle by means of stud bolts 35.

The container 29 is filled with oil and compressed air. The compressed air is utilized for subjecting the oil to a pressure proportional to the load carried by the vehicle and for supporting resiliently the body carried by the truck of the vehicle. The compressed air, in the container 29, is trapped between the cylinder head 33 and the oil which is always maintained above the open end of the cylinder 32.

In order to supply compressed air to the container 29, a pipe nipple 60 which may be connected to any suitable source of compressed air, a ball check valve 58 and a duct 57, are provided. When a source of compressed air is connected to the pipe nipple 60, air flows past the ball check valve 58 to the air duct 57 and thence, through the oil, to the upper part of the container 29.

As will be readily understood, it is only necessary to have the container 29 sealed to hold oil subjected to a pressure, since the oil level is always maintained above the open end of the cylinder 32. As a means for sealing the container 29 for oil subjected to a pressure, piston rings 36, of any suitable type, are utilized. The rings 36 are disposed intermediate the cylinders 30 and 32 in spaced grooves 37 of the cylinder 32. A washer 38, made of any suitable material, such as leather, is utilized as an additional means for sealing the container 29.

The washer 38 is attached to the open end of the cylinder 32 by a metal annulus 39 and extends downwardly to engage the inner wall of the cylinder 30. The outer periphery of the metal annulus 39 is so beveled that the oil in the container 29 will force the washer firmly against the inner wall of the cylinder 30.

Since dirt and other foreign substances are apt to enter the space between the two relatively movable cylinders 30 and 32, a shield 41 is provided. The shield 41 is attached to the cylinder head 33 and extends downwardly so as to enclose closely the open end of the cylinder 30.

It will be observed that, upon each application of the brakes, the amount of oil contained in the container 29 will be diminished and, therefore, pumping means must be provided for replenishing the oil as it is forced into the brake cylinder. As shown in Fig. 2, the pumping means comprises a cylinder 43 attached to the cylinder head 31 and disposed to receive a piston 44 having rings 45. The piston 44 is attached to the cylinder head 33 by means of a piston rod 46 which is screwed into the cylinder head 33.

It will be noted that any relative movements of the body with respect to the truck of the vehicle will cause the piston 44 and the cylinder 43 to produce a pumping action. In communication with the cylinder 43 is a duct 47 which has a ball-check valve 52 mounted therein. The exit end 81 of the duct 47 is connected directly to a fluid reservoir 48 by a pipe 49. The ball-check valve 52 permits the free flow of the oil from the fluid reservoir 48 to the duct 47 but prevents the flow in the opposite direction. Also the duct 47 is connected to the container 29 through a ball-check valve 53 which permits the free flow of the oil from the duct 47 to the container 29 but prevents the flow in the opposite direction.

In order to prevent the pump from continuously delivering oil into the container 29, a by-pass duct 54 is provided. The upper end of the by-pass duct 54 is in communication with the upper end of cylinder 43 and the lower end 82 is connected to the fluid reservoir 48 by a pipe 55.

In explaining the operation of the container 29, let it be assumed that the container 29 is charged with a fluid and compressed air, the level of the fluid being such that the lower end of the piston 44 is below the point where the by-pass duct 54 is in communication with the cylinder 43. Hence, as the body of the vehicle moves up-and-down relatively to the truck frame, the piston 44 reciprocates below the point where the by-pass duct 54 is in communication with the cylinder 43. On an upward movement of the piston 44, oil is drawn from the fluid reservoir 48 through the pipe 49, past the ball-check valve 52, and through the duct 47 into the cylinder 43. On the downward movement of the piston 44, the ball-check valve 52 prevents the return of the fluid to the fluid reservoir 48, and thus the fluid is forced into the container 29 past the ball-check valve 53. Continued operations of the foregoing reciprocating movement of the piston 44 gradually forces an additional supply of fluid into the container 29, and thus causes the piston 44 to rise, until its reciprocating movements are above the point where the by-pass duct 54 is in communication with the cylinder 43. So long as the reciprocating movements of the piston 44 are above the point where the by-pass duct 54 is in communication with the cylinder 43, no additional fluid is delivered to the container 29. On an upward movement of the piston 44, as previously explained, fluid is drawn from the fluid reservoir 48 through the pipe 49, past the ball check valve 52, and the duct 47 into the cylinder 43, but on the downward movement of the piston the oil is forced back into the fluid reservoir 48 through the by-pass duct 54 and the pipe 55. Therefore, by means of the by-pass duct 54, the action of the cylinder 43 and the piston 44 is such that the fluid in the container 29 is maintained at a predetermined level, so that a sufficient quantity of fluid is always in readiness for making a series of brake applications.

Suppose, for example, that, after several brake applications are made, the fluid in the container 29 diminishes to a point where the piston 44 again reciprocates below the point where the by-pass duct 54 is in communication with the cylinder 43. Under this supposition, the action of the cylinder 43 and the piston 44 again forces oil past the ball check valve 53 into the container 29. This action continues until a sufficient quantity of oil is forced into the container 29 to raise the piston 44 above the point where the by-pass duct 54 is in communication with the cylinder 43.

As shown in Fig. 1, the triple valve 21 is connected to the outlet 56 of the container 29 by a pipe 66; to the brake cylinder 10 by a pipe 64, and to the fluid reservoir 48 by a pipe 65 that is connected to the pipe 55 which leads to the fluid reservoir 48.

In explaining the operation of the triple valve 21, in combination with the container 29, let it be assumed that the container 29 is charged with a fluid and compressed air, that the spring 17 is biasing the triple valve 21 to its "off" position, and that the cylinder 23, the control pipe 27 and the foot-pump 24 are fully charged with a fluid. When the triple valve 21 is in the "off" position, the brake cylinder 10 is in communication with the fluid reservoir 48, so that the fluid in the brake cylinder 10, under the biasing force of the spring 12, is forced through the pipe 64, the triple valve 21, the pipe 65, and the pipe 55 into the fluid reservoir 48. Also, in the "off" position of the triple valve 21 the pipe 66 is closed and fluid from the container 29 cannot flow to the brake cylinder 10.

For initiating a brake application, the operator depresses the plunger of the foot-pump 24, and thus forces fluid under pressure into the cylinder 23, which biases the triple valve 21 to its "on" position. When the triple valve 21 is actuated to its "on" position, communication between the brake cylinder 10 and the fluid reservoir 48 is interrupted, but communication is established between the container 29 and the brake cylinder 10. Therefore, fluid under pressure flows from the container 29 through the outlet 56, the pipe 66, the triple valve 21, and the pipe 64 to the brake cylinder 10. Since the brake cylinder is directly connected to the container 29, a braking action is effected that is proportional to the load carried by the vehicle. The brakes may be released by the operator removing his foot from the plunger of the foot-pump 24, thus allowing the spring 17 to again bias the triple valve 21 to its "off" position, whereupon communication between the brake cylinder 10 and the container 29 is blanked and communication between the brake cylinder 10 and the fluid reservoir 48 is re-established.

Therefore, it will be seen that I have disclosed a device for subjecting the fluid provided in a braking system, for transmitting a braking force, to a pressure proportional to the load carried by the vehicle.

I would state, in conclusion, that, while the illustrated example constitutes a practical embodiment of my invention, I do not limit myself strictly to the exact details herein illustrated, since modifications of the same can be considerably varied without departing from the spirit of the invention as defined in the appended claims.

I claim as my invention:

1. A fluid braking system for vehicles, including means for controlling the movements of a fluid provided in a braking system, in combination with a load-carrying container connected to the braking system for subjecting said fluid to a pressure, and means disposed for operation by the movements of the vehicles for maintaining a predetermined amount of said fluid in said container.

2. A fluid braking system for vehicles, including means for controlling the movements of a fluid provided in a braking system, in combination with a load-carrying container connected to the braking system for subjecting said fluid to a pressure, and means provided within said container and disposed for operation by the movements of the vehicle for maintaining a predetermined amount of said fluid in said container.

3. A fluid braking system for vehicles, including means for controlling the movements of a substantially non-compressible fluid provided in a braking system, in combination with a load-carrying means that is connected to the braking system and adapted to entrap a compressible medium for subjecting said substantially non-compressible fluid to a pressure, and means for maintaining a predetermined amount of said substantially non-compressible fluid in said load-carrying means.

4. A fluid braking system for vehicles, including means for controlling the movements of a substantially non-compressible fluid provided in a braking system, in combination with a load-carrying means that is connected to the braking system and adapted to entrap a compressible medium for subjecting said substantially non-compressible fluid to a pressure, and means disposed for operation by the movements of the vehicle for maintaining a predetermined amount of said substantially non-compressible fluid in said load-carrying means.

5. A fluid braking system for vehicles including means for controlling the movements of a substantially non-compressible fluid provided in the braking system, in combination with a load-carrying container comprising two relatively movable telescopic cylinders connected to the braking system and adapted to entrap a compressible medium, a fluid pump mounted within the container and actuated by the relative movements of the telescopic cylinders, means associated with the pump for maintaining the non-compressible fluid at a predetermined level within the container, and means whereby a compressible medium may be introduced into the container above the level of the non-compressible fluid.

6. A load-carrying device comprising, in combination, two relatively movable elements forming a fluid container, adapted to entrap a compressible medium, a reservoir for containing a supply of substantially non-compressible fluid, means interconnecting the fluid container and the reservoir, means actuated by the relative movements of the said elements for maintaining the non-compressible fluid at a predetermined level within the container, and means whereby a compressible medium may be introduced into the container above the level of the non-compressible fluid.

WINSTON A. BRECHT.